(12) United States Patent
Wallace

(10) Patent No.: US 7,515,894 B2
(45) Date of Patent: Apr. 7, 2009

(54) SYSTEM AND METHOD FOR PROVIDING A MULTIBAND ANTENNA

(75) Inventor: Ray Wallace, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 1419 days.

(21) Appl. No.: 10/108,011

(22) Filed: Mar. 26, 2002

(65) Prior Publication Data

US 2003/0186667 A1 Oct. 2, 2003

(51) Int. Cl.
*H04B 1/10* (2006.01)
(52) U.S. Cl. ......................... 455/284; 455/78
(58) Field of Classification Search ............ 455/552.1, 455/553.1, 556.1, 556.2, 575.7, 78, 82, 83, 455/269, 284
See application file for complete search history.

(56) References Cited

U.S. PATENT DOCUMENTS

| | | | | |
|---|---|---|---|---|
| 5,023,935 A | * | 6/1991 | Vancraeynest | 455/80 |
| 5,193,218 A | * | 3/1993 | Shimo | 455/80 |
| 6,021,318 A | * | 2/2000 | Schaffer | 455/78 |
| 6,088,348 A | * | 7/2000 | Bell et al. | 370/343 |
| 6,097,974 A | * | 8/2000 | Camp et al. | 455/575.7 |
| 6,298,243 B1 | * | 10/2001 | Basile | 455/552.1 |
| 6,694,129 B2 | * | 2/2004 | Peterzell et al. | 455/76 |
| 6,816,711 B2 | * | 11/2004 | Standke et al. | 455/73 |
| 2002/0049041 A1 | * | 4/2002 | Marshall et al. | 455/78 |
| 2002/0107033 A1 | * | 8/2002 | Kim | 455/456 |
| 2003/0054775 A1 | * | 3/2003 | Eaves et al. | 455/80 |

* cited by examiner

*Primary Examiner*—Sam Bhattacharya

(57) ABSTRACT

A system and a method for wireless communications includes an antenna, a GPS circuit with a GPS matching circuit that is coupled to the antenna, a communications circuit with a communications matching circuit that is coupled to the antenna. The communications matching circuit is adapted to switch between different impedances, for example, to match the communications circuit with the antenna for a particular communications band or to isolate the communications circuit from the antenna. The communications matching circuit or the GPS matching circuit may be actively adapted.

10 Claims, 9 Drawing Sheets

SYSTEM AND METHOD FOR PROVIDING A MULTIBAND ANTENNA

FIELD OF THE INVENTION

The present invention generally relates to systems and methods that provide a multi-band antenna and, more specifically, systems and methods that provide a global positioning system (GPS)-enabled wireless communications device.

BACKGROUND OF THE INVENTION

A conventional hand-held global positioning system (GPS) device provides positional information about the location of the GPS device by receiving and processing GPS band signals from a GPS system including satellites and base stations. Although such positional information can be quite useful, it is not convenient to carry a conventional GPS device along with a multitude of mobile wireless communications devices such as laptops, mobile phones, PDAs, or other mobile devices on which users now depend. It is therefore desirable that a GPS positioning function be included with another device, such as a wireless mobile handset.

Unfortunately, the integration of GPS technology with other mobile wireless communications devices such as, for example, cellular or personal communications services (PCS) phones has proven difficult. In particular, three alternatives have been identified for adding GPS capability to a wireless device or handset, but have proven unsatisfactory in use.

A first choice is to add GPS capability in a wireless handset by adding a separate antenna for GPS reception. Since the wireless network antenna is not modified, network communications quality is not adversely affected. However, as mobile handsets for wireless networks have become much smaller, less space is available on the handset housing to accommodate a separate, custom-designed GPS antenna. Furthermore, a GPS antenna disposed within the handset housing typically suffers from a number of reception problems. For example, poor reception can be caused by electromagnetic shielding within the handset housing and by the handset housing itself. Adjusting the electromagnetic shielding to accommodate the GPS antenna may cause substantial redesign and testing of the handset. Even the hand of the user of the wireless handset may interfere with the reception by the internal GPS antenna as the user grips the handset housing. Also, adding a separate antenna and its associated circuitry to the wireless handset adds expense and design complexity.

A second choice is to add GPS capability to a wireless handset by forcing the existing network antenna on the wireless handset to adequately receive a GPS band signal. For example, a typical dual-band antenna may be constructed to receive a PCS signal at approximately 1900 MHz and a cellular signal at approximately 800 MHz. It may therefore be possible that the existing dual-band antenna may be able to receive a GPS signal at approximately 1575 MHz. However, the GPS signal is at a non-resonant frequency for the dual-band antenna, so the received GPS signal would be less than optimal resulting in degraded signal transfer. In this regard, known dual-band antenna systems are not able to receive a GPS signal with sufficient strength and quality to implement a robust GPS location functionality on a wireless handset.

A third choice is to add GPS capability to a wireless handset by using a tri-band antenna. A tri-band antenna is constructed to receive the cellular, PCS and GPS frequencies, for example. Although such an antenna enables the GPS signal to be received, due to the limitations of antenna design such an antenna normally compromises either the cellular or PCS performance, or both. Using a tri-band antenna also substantially adds extra cost to the antenna.

Accordingly, there exists a need to add GPS position location capability in a wireless handset in a robust, economical manner. Furthermore, it would be desirable that the GPS position location capability be provided in a convenient, aesthetically pleasing manner.

SUMMARY OF THE INVENTION

The present invention alleviates to a great extent the disadvantages of conventional apparatus and methods for providing a multiband antenna.

In a preferred embodiment, the present invention provides a system and a method for providing a multiband antenna. A wireless communications device may include an antenna, GPS circuitry including a GPS matching circuit, and communications circuitry including a communications matching circuit. The GPS matching circuit is coupled to the antenna and structured to match the GPS circuitry to the antenna. The communications matching circuit is coupled to the antenna and structured to match the communications circuitry to the antenna. The communications matching circuit or the GPS matching circuit may be actively adapted.

The present invention has an advantage in that the wireless communications device may employ a single antenna. The use of a single antenna saves on valuable space in the hand-held device, reduces expenses and improves reception characteristics, especially by the GPS circuitry.

The present invention has an advantage in that the wireless communications device may provide circuitry to match the GPS circuitry to the antenna and circuitry to match the communications circuitry to the antenna and thereby improve reception and/or transmission characteristics of the wireless communications device.

The present invention has an advantage in that the wireless communications device may provide an adaptive communications matching circuit that can isolate the communications circuitry from the antenna and may provide superior GPS signal reception by the GPS circuitry.

These and other features and advantages of the present invention will be appreciated from review of the following detailed description of the present invention, along with the accompanying figures in which like reference numerals refer to like parts throughout.

DETAILED DESCRIPTION OF THE INVENTION

Figure 1:
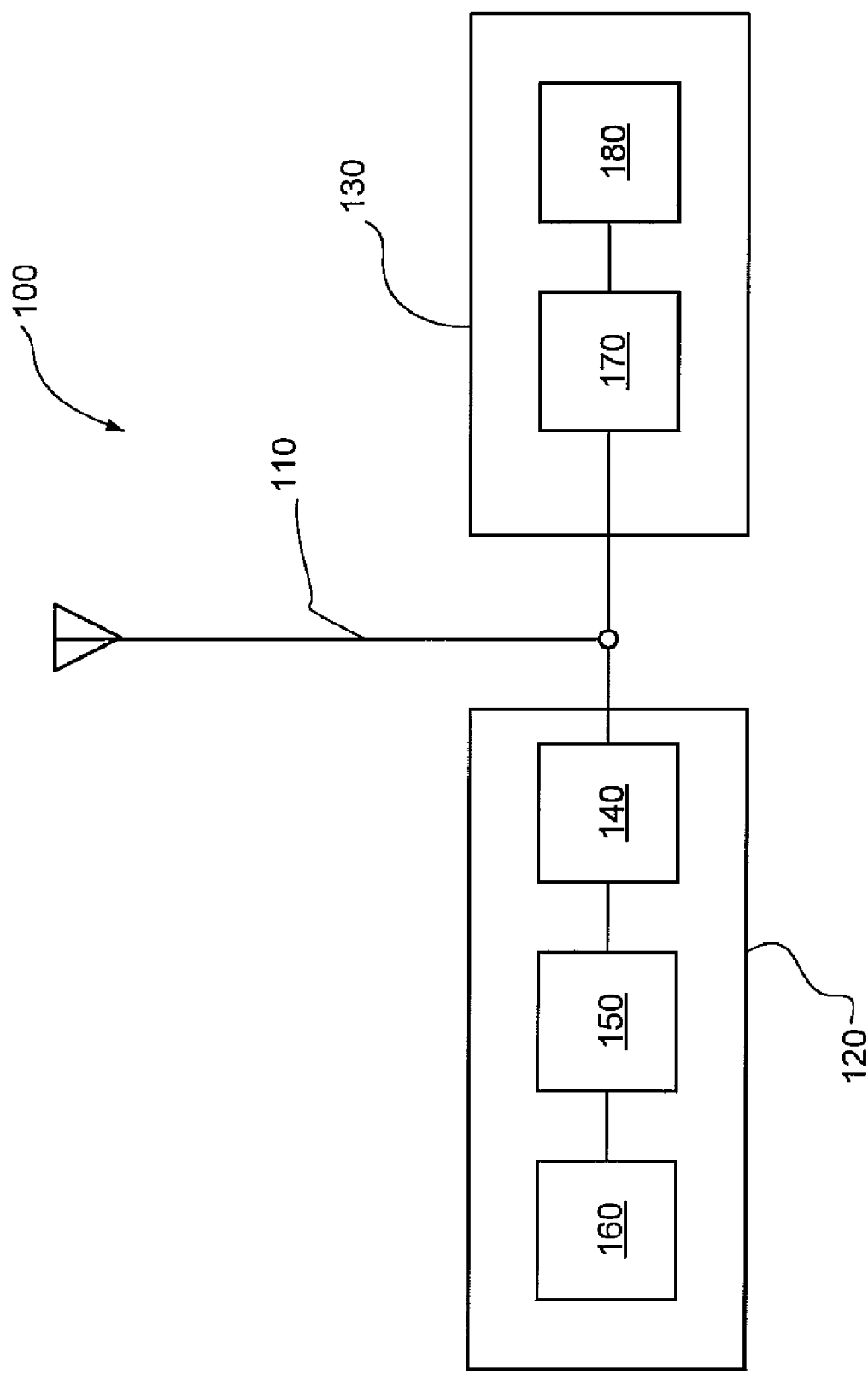
FIG. 1 shows a wireless communications device according to the present invention.

FIG. 1 illustrates an exemplary embodiment of a wireless communications system including a wireless communications device 100. The wireless communications device 100 may include, for example, a handheld wireless communications device, a mobile phone, a car phone, a cellular phone, a personal communications services (PCS) phone, a cordless phone, a laptop computer or other computing device with a wireless modem, a pager, a personal digital assistant (PDA) or some combination thereof. The wireless device 100 may be digital or analog or some combination thereof. Indeed, the wireless communications device 100 may include other wireless communications devices known to one of ordinary skill in the art.

The wireless communications device 100 may include, for example, an antenna 110, a GPS receiver module 120 or a communications transceiver module 130. The GPS receiver module 120 and the communications transceiver module 130 are each coupled to the antenna 110.

The GPS receiver module 120 may include, for example, a GPS matching module 140, a GPS filter 150, a GPS receiver 160 and other GPS circuitry (not shown) known to one of ordinary skill in the art. The antenna 110 is coupled to the GPS matching module 140 which, in turn, is coupled to the GPS filter 150 which, in turn, is coupled to the GPS receiver 160. The GPS receiver 160 or the other components may be coupled to other GPS circuitry (not shown) known to one of ordinary skill in the art. For example, the GPS receiver 160 may be coupled to a GPS signal processor or a control unit of the wireless communications device 100. Additional circuitry can be inserted between the above-recited components. For example, a GPS low noise amplifier may be inserted between the GPS matching module 140 and the GPS filter 150.

The communications transceiver module 130 may be adapted for transmitting and receiving communications signals via at least one communications bands such as, for example, the cellular communications band, the personal communications services (PCS) communications band or any other communications band known to one of ordinary skill in the art. The communications transceiver module 130 may include, for example, a communications matching module 170, a communications transceiver 180 and other communications circuitry (not shown) known to one of ordinary skill in the art. The antenna 110 is coupled to the communications matching module 170 which, in turn, is coupled to the communications transceiver 180. The communications transceiver 180 or the other components may be coupled to other communications circuitry (not shown) known to one of ordinary skill in the art. For example, the communications transceiver 180 may be coupled to a communications signal processor or a control unit of the wireless communications device 100. Additional circuitry may be inserted between the above-recited components. For example, conventional signal amplifiers may be inserted between the communications matching module and the communications transceiver 180.

Figure 2:
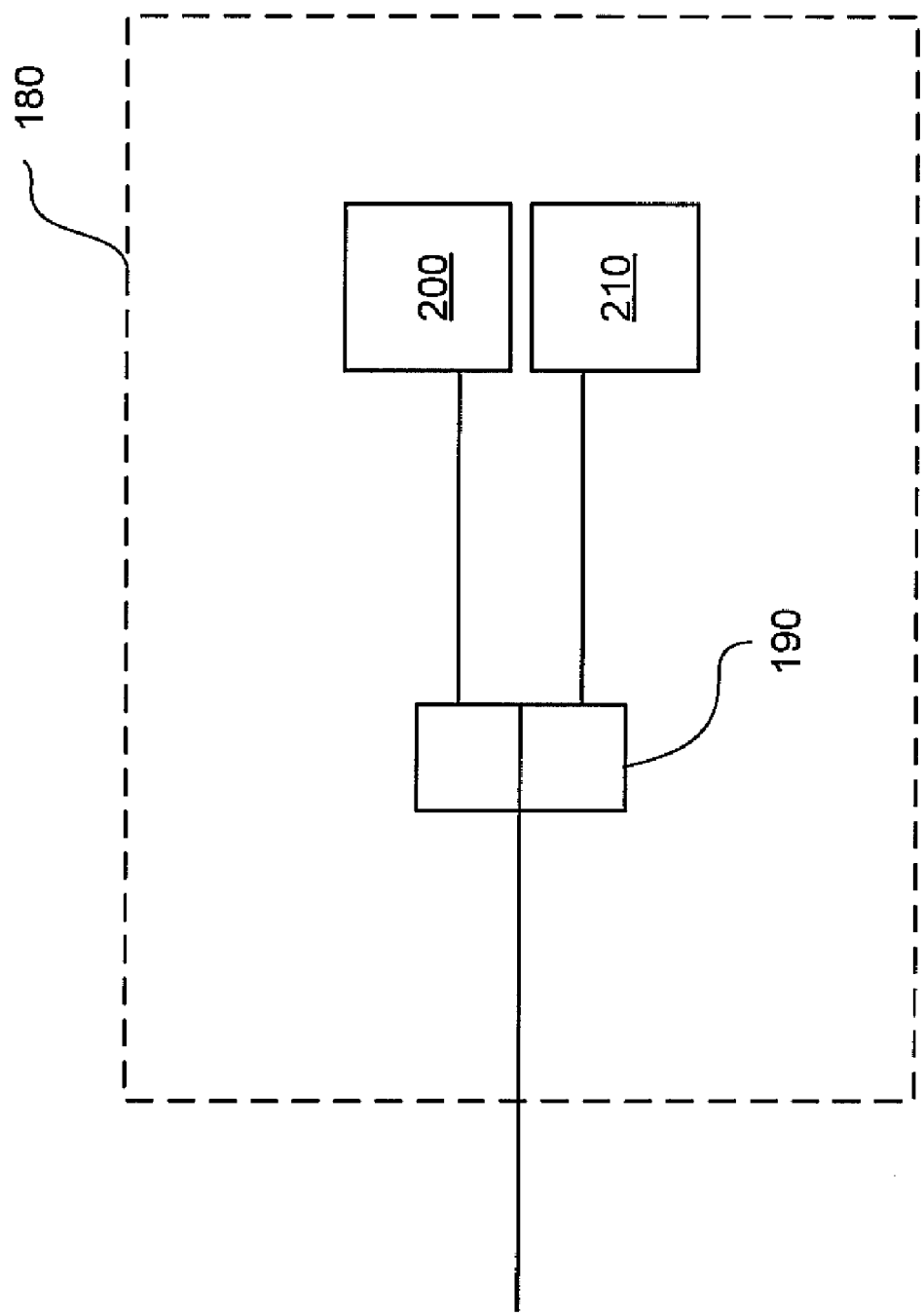
FIG. 2 shows a communications transceiver according to the present invention.

FIG. 2 shows an example of some components of the communications transceiver 180. In an example, the communications transceiver 180 is structured to transmit and to receive in one communications band (e.g., the cellular communications band or the PCS communications band). In one example, the communications transceiver 180 includes a duplexer 190, a transmitting module 200, a receiving module 210 and other communications circuitry (not shown) known to one of ordinary skill in the art and not described further herein. The transmitting module 200 and the receiving module 210 include conventional communications circuitry such as, for example, oscillators, amplifiers and filters, which are known to one of ordinary skill in the art and not described further. The transmitting module 200 and the receiving module 210 are each coupled to the duplexer 190 which, in turn, is coupled to the matching module 170.

Figure 3:
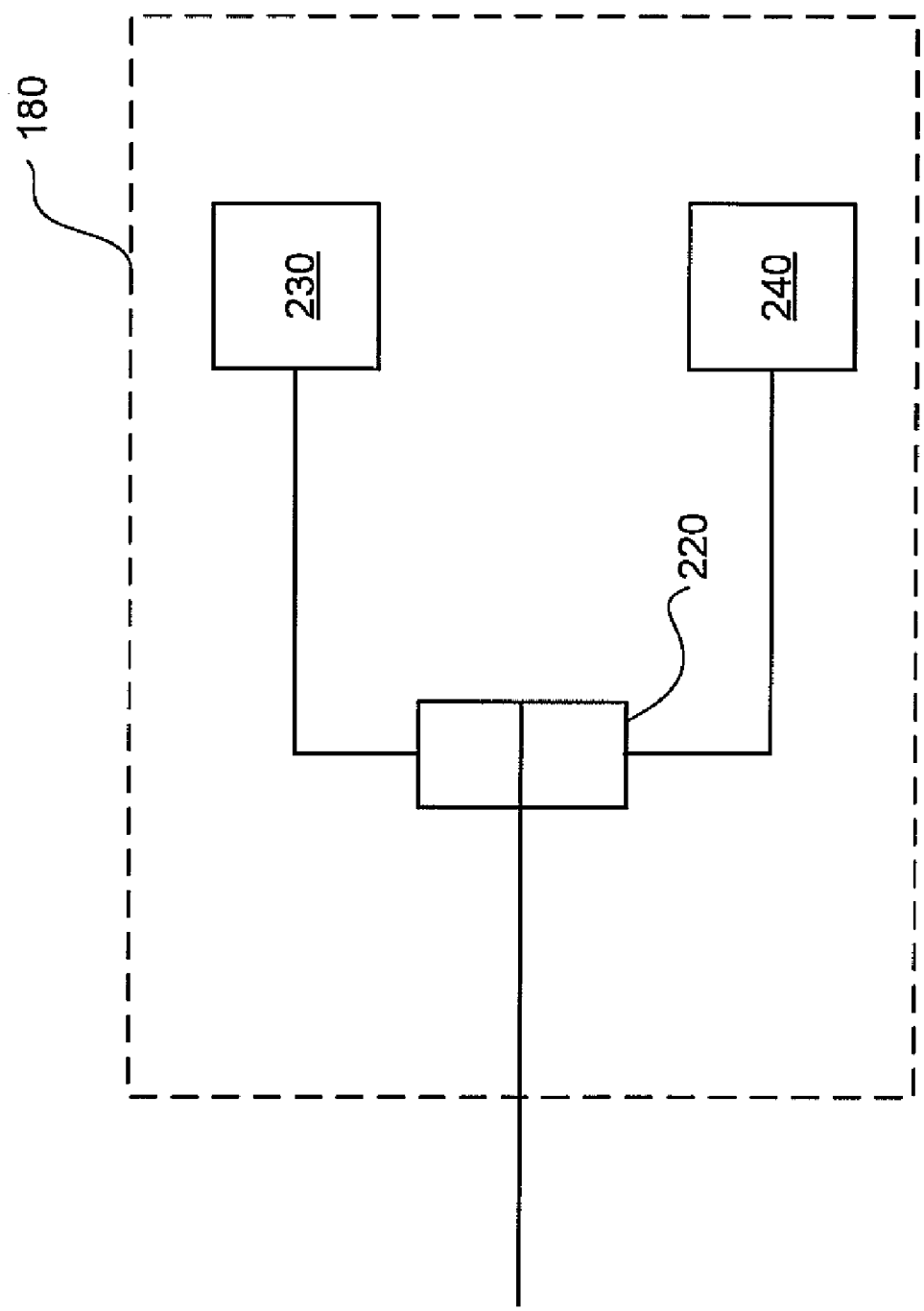
FIG. 3 shows a communications transceiver according to the present invention.

FIG. 3 shows another example of the communications transceiver 180. In an example, the communications transceiver 180 is structured to transmit and to receive in two communications band (e.g., the cellular communications band and the PCS communications band). In one example, the communications transceiver 180 includes a diplexer 220, a first communications band module 230, a second communications band module 240 and other communications circuitry (not shown) known to one of ordinary skill in the art and not described further herein. The first communications band module 230 and the second communications band module 240 include conventional communications circuitry (not shown) adapted for use in respective communications bands. For example, the first communications band module 230 may include conventional communications circuitry adapted for transmitting and receiving communications signals in the cellular communications band and the second communications band module 240 may include conventional communications circuitry adapted for transmitting and receiving communications signals in the PCS communications band. The first communications band module 230 and the second communications band module 240 are each coupled to the diplexer 220 which, in turn, is coupled to the matching module 170.

It will be appreciated that various degrees of integration and overlap may be used between units in the wireless communications device 100. Thus, although the figures disclosed herein may illustrate separate components or modules, such components or modules may be integrated or may overlap, at least in part, with each other. For example, although FIG. 3 illustrates two separate modules, the first communications band module 230 and the second communications band module 240, it will be appreciated by one of ordinary skill in the art that the first communications band module 230 and the second communications band module 240 may share some components such as, for example, oscillators or a main controller of the wireless communications device 100.

In another example, although FIG. 1 illustrates two separate modules, the communications matching module 170 and the communications transceiver 180, the communications matching module 170 may be integrated, at least in part, with the communications transceiver 180. For example, in FIG. 4, matching modules 170a, 170b have been integrated into the different communications band branches of the communications transceiver 180 by disposing the matching modules 170a, 170b between the diplexer 220 and the communications band modules 230, 240. Each communications band branch of the communications transceiver 180 may thus benefit from the matching modules 170a, 170b that, for example, may have been adapted for use in the respective communications bands.

Figure 4:
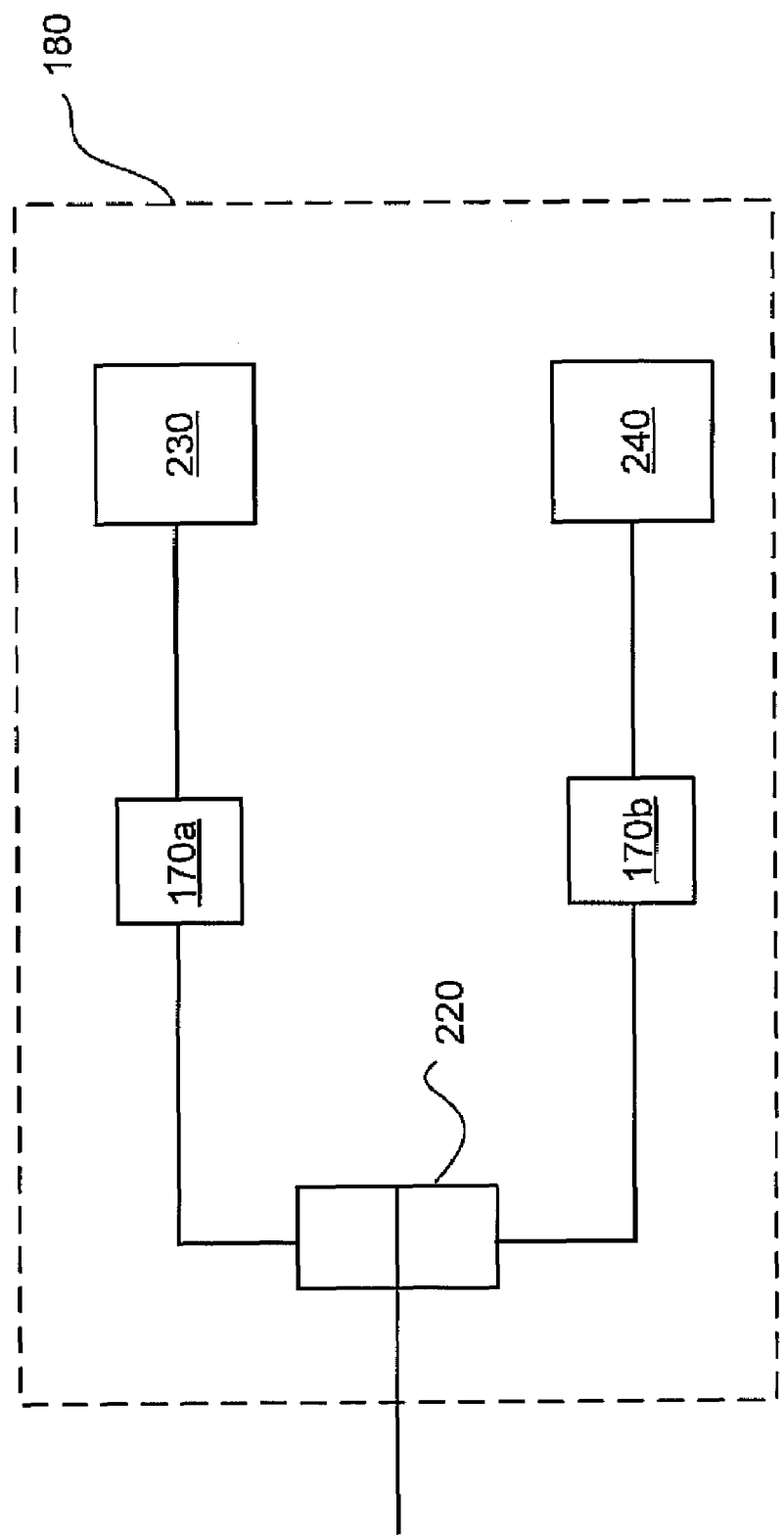
FIG. 4 shows a communications transceiver according to the present invention.
Figure 5:
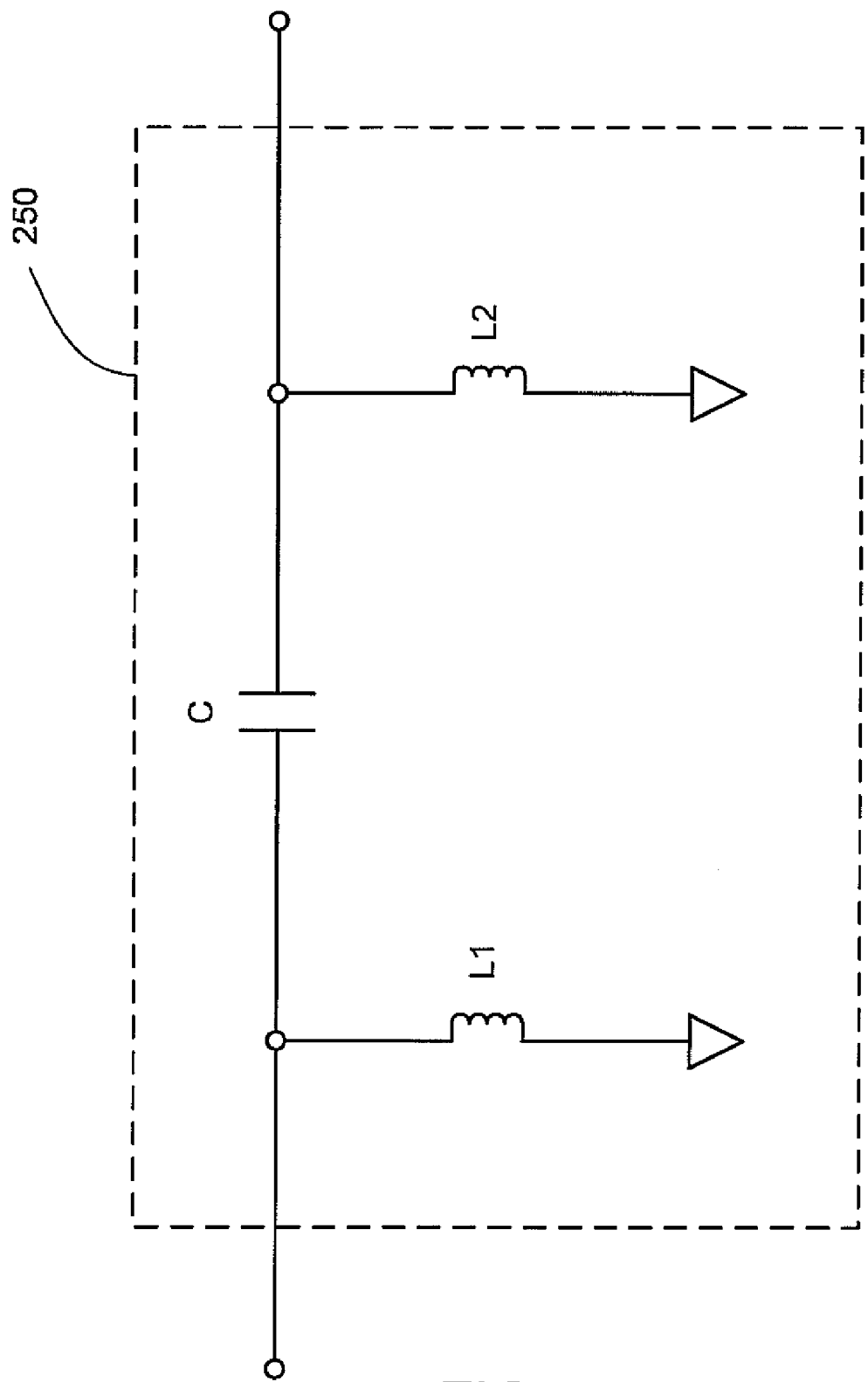
FIG. 5 shows matching circuitry according to the present invention.

FIG. 5 illustrates an example of matching circuitry 250 that may be included in the GPS matching module 140 or the communications matching module 170. The matching circuitry 250 which includes inductors $L_1$, $L_2$ and a capacitor $C_1$ in a particular matching configuration. The matching circuit 250 may include other matching circuitry arrangements and configurations including more or less complex matching circuitry arrangements and configurations and their equivalents (e.g., dual equivalents). The matching circuitry 250 may include passive elements, active elements or combinations thereof. For example, the matching circuitry 250 may include one or more inductors, capacitors, resistors or combinations thereof in serial or parallel arrangements known to one of ordinary skill in the art. Such matching arrangements, configurations and their structural and functional equivalents are available, without undue experimentation, to one of ordinary skill in the art. The matching circuitry 250 may be adapted for use in the GPS matching module 140 to match the GPS receiver module 120 to the antenna 110. A different matching circuitry 250 may be adapted for use in the communications transceiver module 130 to match the communications transceiver module 130 to the antenna 110. Furthermore, as illustrated in FIG. 4, two possibly different matching circuitry 250 may be adapted for use in the matching modules 170a, 170b. A first matching circuitry 250 may be adapted to match the first communications band module 230 to the antenna and a second matching circuitry 250 may be adapted to match the second communications band module 240 to the antenna.

In operation, the antenna 110 may receive signals from multiple bands such as the GPS band and at least one of the communications bands. The GPS matching module 140 matches the GPS receiver module 120 with the antenna 110 for the GPS band. Thus, a substantial amount of GPS signal received via the antenna 110 reaches the GPS filter 150 which, in turn, filters the GPS signal from other frequency bands. The filtered GPS signal is then received by the GPS receiver 160 where it may, for example, be amplified or signal processed.

Similarly, the communications matching module 170 matches the communications transceiver module 130 with the antenna 110 for the communications bands. In one example, although the communications matching module 170 and the GPS matching module 140 may interact, they do not interfere with each other. Where the communications transceiver module 130 is adapted for only one communications band, the matching module 170 may be structured to match the communications transceiver module 130 for the particular communications band. Where the communications transceiver module 130 is adapted for two communications bands, the matching module 170 may be structured to optimize one communications bands over another communications band or may be structured to form a compromise match in which each of the communications bands is slightly unmatched. As in the case in FIG. 4, the matching modules 170a, 170b can be integrated with a branch of the respective communications band. Thus, for example, each matching module may provide matching for its respective communications band circuitry.

In addition, the matching module 170 may be structured to adapt the match depending upon which communications band is in use at the time. Thus, for example, where the communications transceiver module 130 supports both the cellular communications band and the PCS communications band, the matching module 170 can be actively adapted to switch between different matching circuitry or configurations so that the communications transceiver module and the antenna are matched for the particular communications band being used. Thus, the matching module 170 can be effectively switched between matching the cellular communications band circuitry and the PCS communications band circuitry to the antenna 110.

Figure 6:
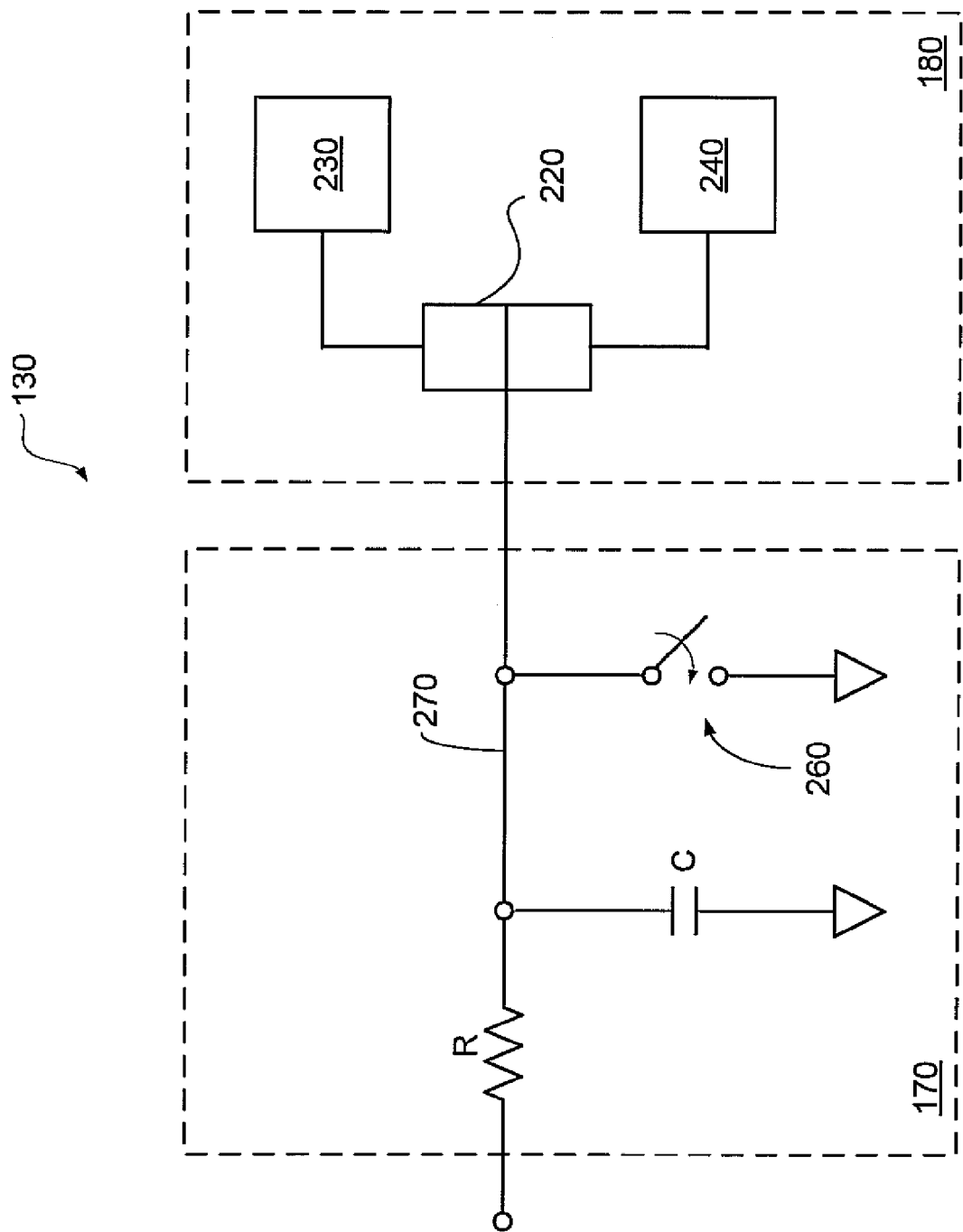
FIG. 6 shows a matching circuit according to the present invention.

FIG. 6 shows an example of an adaptive matching circuit according to the present invention. In this example, the communications transceiver module 130 has been adapted for dual-band communications and includes the diplexer 220 coupled to the first communications band module 230 and the second communications band module 240. The communications matching module 170 includes a matching circuit that can be adapted to provide different matches between the communications transceiver module 130 and the antenna by switching a switch 260. As illustrated, the matching circuit includes a resistor R, a capacitor C and the switch 260. The antenna 110 is coupled to the resistor R which, in turn, is coupled to the diplexer 220 of the communications transceiver 180. The capacitor C and the switch 260 are both coupled to a common potential (e.g., chassis ground) and also coupled to a node 270 between the resistor R and the diplexer 220. The matching circuit provides a different impedance depending upon whether the switch 260 is open or close. Accordingly, the communications matching module 170 can provide different matches. For example, the communications matching module 170 may provide a first match between the cellular communications band circuitry in module 230 and the antenna 110 or may provide a second match between the PCS communications band circuitry in module 240 and the antenna 110. The switch 260 can be controlled, for example, via a main controller of the wireless communications device 100 as a function of which communications band is being used.

Figure 7:
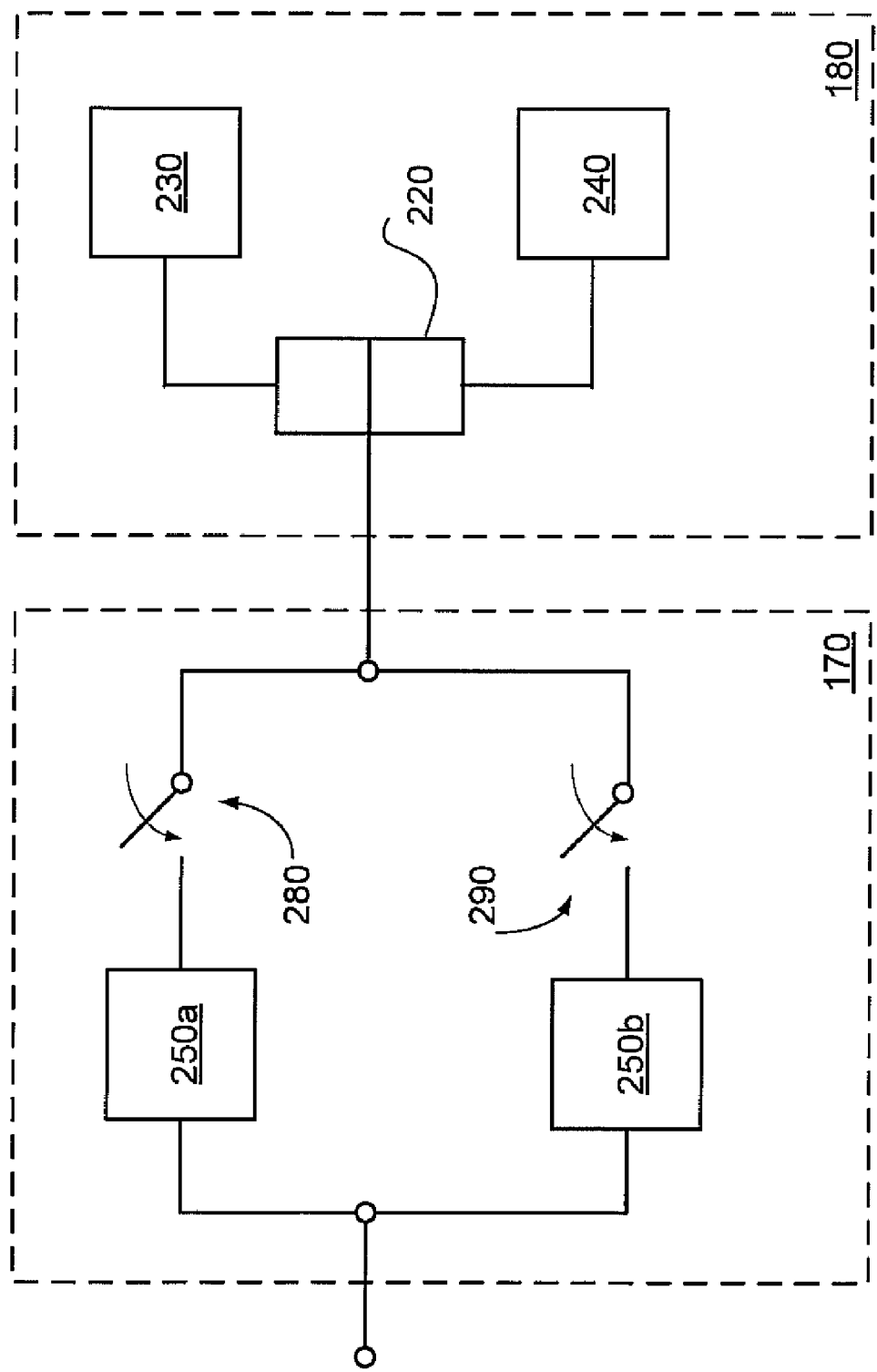
FIG. 7 shows a matching circuit according to the present invention.
Figure 8:
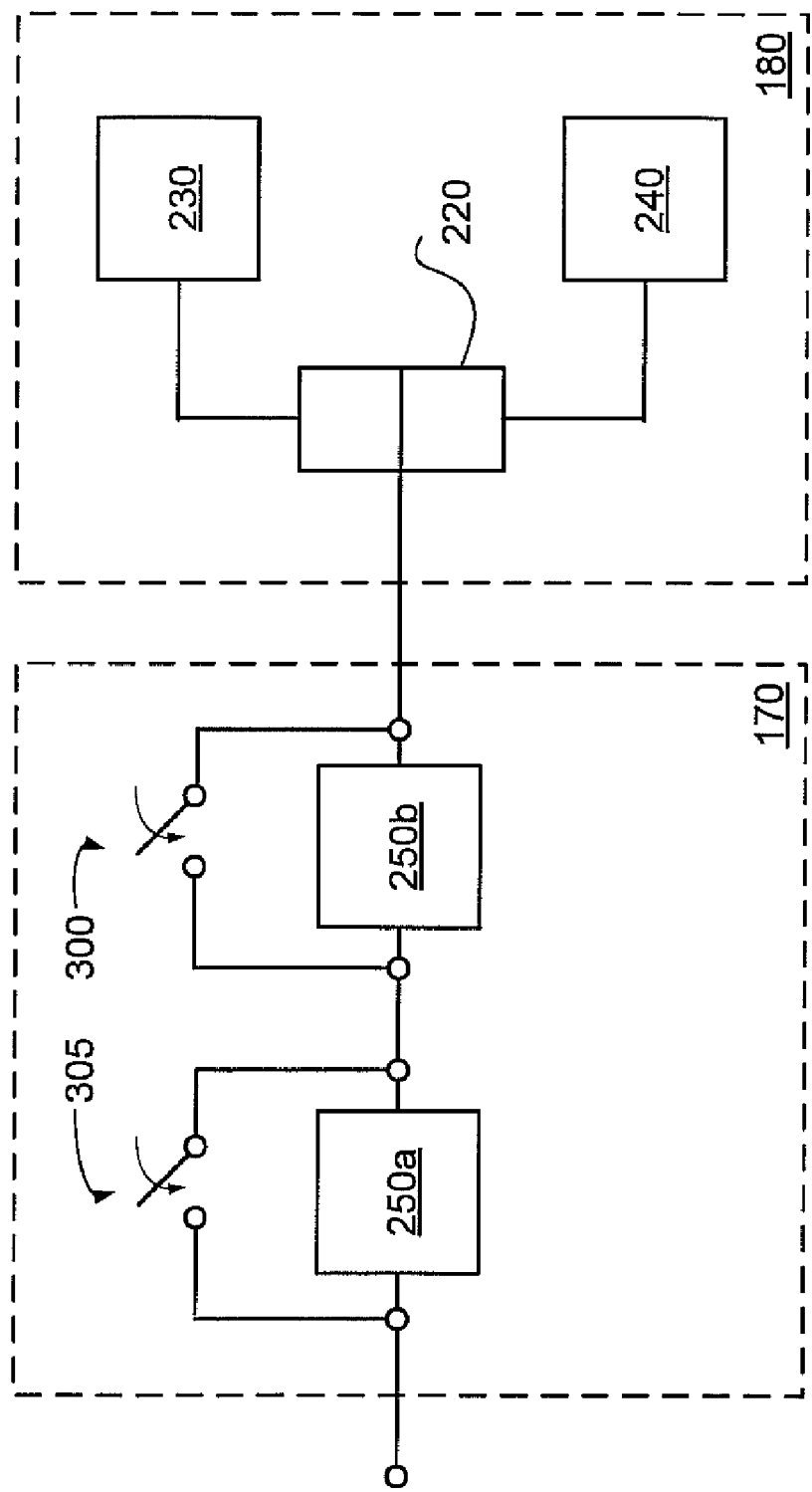
FIG. 8 shows a matching circuit according to the present invention.

FIG. 6 presents only an example of a matching circuit that can be actively adapted. FIGS. 7 and 8 show other block configurations for adapting a matching circuit. For example, in FIG. 7, the communications matching module 170 includes two branches in a parallel configuration. A matching circuit 250a and a switch 280 are coupled in a first branch of the communications matching module 170. A matching circuit 250b and a switch 290 are coupled in a second branch of the communications matching module 170. Accordingly, by opening one switch and closing the other switch, one of the two branches can be activated to provide its matching circuit. Thus, for example, matching circuit 250a can provide the match between the first communications band module 230 and the antenna 110 when the switch 280 is closed and the switch 290 is open. In another example, the matching circuit 250b can provide the match between the second communications band module 240 and the antenna 110 when the switch 290 is closed and the switch 280 is open. Alternatively, the switch 280 can be closed and the other switch 290 can be opened or closed such that the matching module 170 provides either matching circuit 250a or a parallel configuration of matching circuit 250b and matching circuit 250a. Furthermore, by opening both switches 280, 290 the communications transceiver module 130 can be isolated from the antenna 110.

FIG. 8 shows a series configuration of an adaptive matching circuit according to the present invention. In this example, the matching circuits 250a, 250b are coupled in a series configuration with a switch 300 in parallel with one of the matching circuits 250b. Accordingly, the matching module 170 may provide via the switch 300 either matching circuit 250a or a series configuration including matching circuit 250a and matching circuit 250b. Other configurations are also contemplated by the present invention in which a switch or switches adapt the match provided by the matching module.

Figure 9:
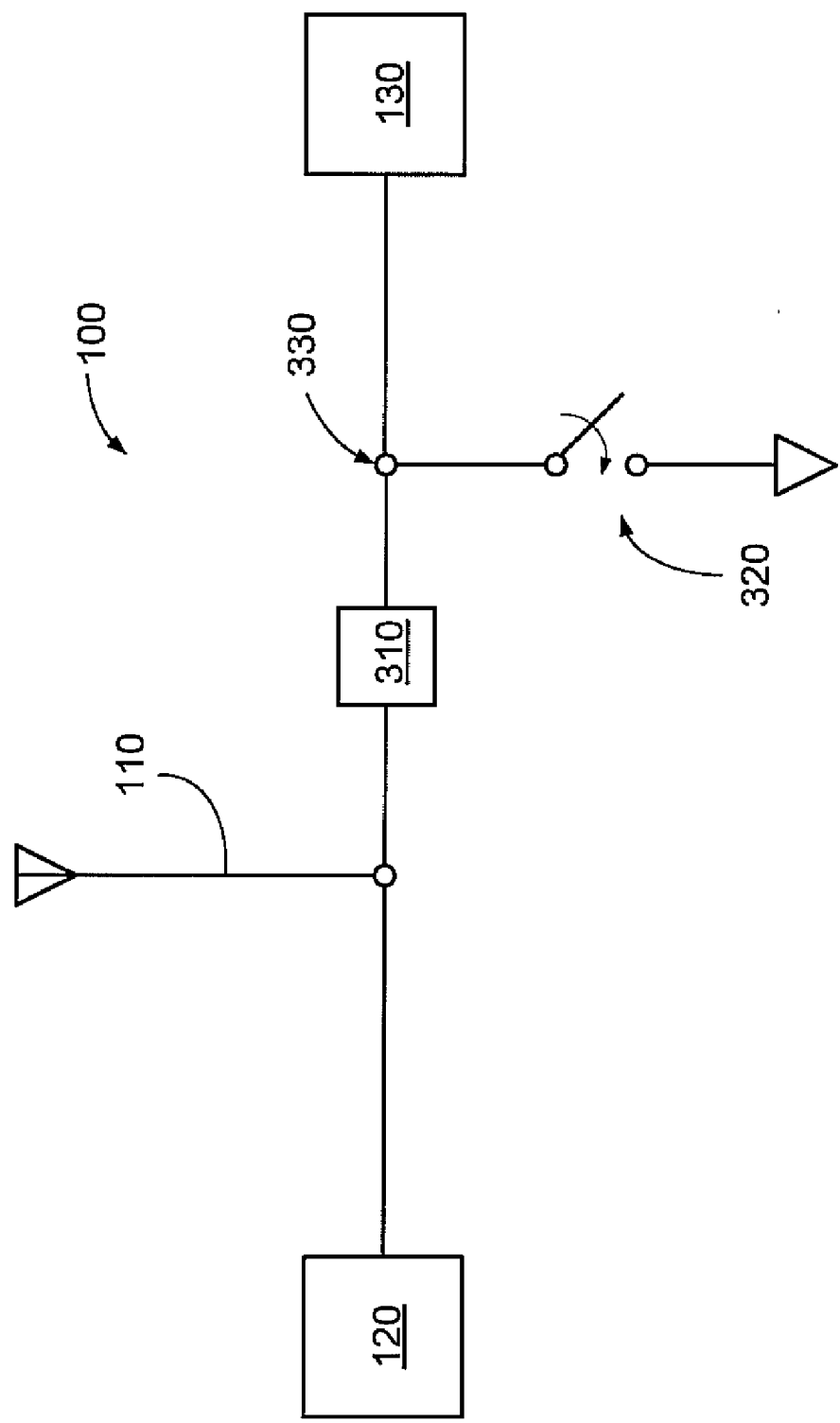
FIG. 9 shows a wireless communications device according to the present invention.

FIG. 9 shows an example of adaptive matching according to the present invention. As illustrated, the wireless communications device 100 includes the antenna 110, the GPS receiver module 120, the communications transceiver module 130, a component 310 and a switch 320. The component 310 may be, for example, a quarter-wave transformer or a quarter-wave stub. The GPS receiver module 120 is coupled to the antenna 110. The communications transceiver module 130 is coupled to the antenna 110 via the component 310. The switch 260 is coupled to a common potential such as, for example, a chassis ground, and is also coupled to a node 330 between the component 310 and the communications transceiver module 130.

In operation, the switch 320 is used to isolate the communications transceiver module 130 from the GPS receiver module 120. For example, when the switch 270 is closed, it shorts, for example, the end of the quarter-wave transformer 310 to electrical ground. When shorted to electrical ground, the impedance of the quarter-wave transformer 310 is very high, and thus effectively removes and/or removes the communications transceiver module 130 from the antenna path.

In another example, the component 310 is structured such that when the switch 320 is closed, substantially only signals in the particular communications band being used are grounded via the switch 320. Accordingly, the GPS receiver module 120 receives a combined signal (i.e., signals from the GPS band and the communications band) with a substantially smaller communications band component. Thus, the GPS receiver module 120 receives a less noisy GPS signal and improves GPS reception.

Thus, it is seen that systems and methods for providing a multiband antenna are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the present invention as well.

What is claimed is:

1. A wireless communications device, comprising:
   a single antenna;
   a GPS impedance matching circuit, the GPS impedance matching circuit being coupled between the antenna and GPS circuitry and structured to match a GPS circuit impedance of the GPS circuitry to an antenna impedance of the antenna; and
   a communications impedance matching circuit, the communications matching circuit being coupled between the antenna and a communications circuit and structured to match a communication circuit impedance of the communications circuit to the antenna impedance and to be switched between a first matching impedance for a cellular communications band circuit and a second matching impedance for a personal communications services (PCS) communications band circuit.

2. The wireless communications device according to claim 1, wherein the communications circuit comprises the cellular communications band circuit and the personal communications services (PCS) communications band circuit,
   wherein the communications impedance matching circuit comprises a cellular band impedance matching circuit having the first matching impedance, the cellular band impedance matching circuit being structured to match a cellular communication band circuit impedance of the cellular communications band circuit to the antenna impedance, and
   wherein the communications matching circuit includes a PCS band impedance matching circuit having the second matching impedance, the PCS matching circuit being structured to match a PCS communications band circuit impedance of the PCS communications band circuit to the antenna impedance.

3. The wireless communications device according to claim 1, wherein the communications impedance matching circuit is structured to isolate the communications circuit from the antenna.

4. The wireless communications device according to claim 1, wherein the communications impedance matching circuit is structured not to interfere with the GPS impedance matching circuit.

5. The wireless communications device according to claim 1, wherein the communications impedance matching circuit is structured to improve reception characteristics of a GPS band by the GPS circuit.

6. The wireless communications device according to claim 1, wherein the communications impedance matching circuit is structured to provide a substantially open circuit impedance.

7. A wireless communications device, comprising:
   a single antenna having an antenna impedance;
   GPS receiving means for receiving GPS signals via the single antenna and having a GPS receiving means impedance;
   GPS impedance matching means for matching the GPS receiving means impedance to the antenna impedance;
   communications band receiving means for receiving communications band signals via the single antenna and having a communication band receiving means impedance;
   adaptive matching means for adaptively matching the communications band receiving means impedance to the antenna impedance; and
   switching means for switching the adaptive matching means between a first matching impedance for a cellular communications band circuit and a second matching impedance for a personal communications services (PCS) communications band circuit.

8. The wireless communications device according to claim 7, wherein the adaptive matching means includes means for isolating communications circuitry from the single antenna.

9. A wireless communications device, comprising:
   a single antenna;
   a matching circuit comprising:
   a GPS impedance matching circuit, the GPS impedance matching circuit being coupled between the antenna and GPS circuitry comprising a GPS filter and GPS receiver and structured to match the GPS circuit impedance of the GPS circuitry to an antenna impedance of the antenna; and
   a communications impedance matching circuit coupled between the antenna and a communications transceiver at the same time the GPS impedance matching circuit is coupled to the antenna, the communications matching circuit having a first port connected to the antenna, a second port connected to the GPS circuitry, and a third port connected to the communication transceiver and structured to match a transceiver impedance of the communications transceiver to the antenna impedance and to be switched between a first matching impedance for a cellular communications band circuit and a second matching impedance for a PCS communications band circuit.

10. The wireless communications device according to claim 9, wherein the communications circuit includes the cellular communications band circuit and the personal communications services (PCS) communications band circuit,
    wherein the communications impedance matching circuit includes a cellular band impedance matching circuit, the cellular band impedance matching circuit being structured to match the impedance of the cellular communications band circuit to the impedance of the antenna, and
    wherein the communications matching circuit includes a PCS band impedance matching circuit, the PCS matching circuit being structured to match the impedance of the PCS communications band circuit to the impedance of the antenna.

* * * * *